United States Patent
Hidaka et al.

(10) Patent No.: US 7,133,274 B2
(45) Date of Patent: Nov. 7, 2006

(54) MULTILAYER CAPACITOR AND MOLD CAPACITOR

(75) Inventors: Akio Hidaka, Miyazaki (JP); Yuuichi Murano, Koyu-gun (JP); Shinichi Wakasugi, Miyazaki-gun (JP); Hidetsugu Fujimoto, Miyazaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/333,543

(22) Filed: Jan. 18, 2006

(65) Prior Publication Data

US 2006/0158825 A1 Jul. 20, 2006

(30) Foreign Application Priority Data

| Jan. 20, 2005 | (JP) | ............ P.2005-012313 |
| Jun. 2, 2005 | (JP) | ............ P.2005-162276 |
| Jun. 2, 2005 | (JP) | ............ P.2005-162277 |

(51) Int. Cl.
*H01G 4/05* (2006.01)
*H01G 4/06* (2006.01)

(52) U.S. Cl. ................. 361/303; 361/311

(58) Field of Classification Search ........ 361/303–305, 361/311–313
See application file for complete search history.

(56) References Cited

U.S. PATENT DOCUMENTS

| 4,419,713 A * | 12/1983 | Levinson ............... 361/321.2 |
| 4,617,609 A | 10/1986 | Utner et al. |
| 4,734,819 A | 3/1988 | Hernandez et al. |
| 4,748,537 A | 5/1988 | Hernandez et al. |
| 4,959,505 A | 9/1990 | Ott |
| 5,420,745 A | 5/1995 | Hidaka et al. |
| 5,466,887 A | 11/1995 | Hasegawa |
| 5,712,758 A | 1/1998 | Amano et al. |
| 5,883,780 A | 3/1999 | Noji et al. |
| 5,889,445 A | 3/1999 | Ritter et al. |
| 6,046,507 A | 4/2000 | Hatchard et al. |
| 6,052,272 A * | 4/2000 | Kuroda et al. ............. 361/303 |
| 6,134,098 A * | 10/2000 | Kuroda et al. ............. 361/321.2 |
| 6,316,726 B1 | 11/2001 | Hidaka et al. |
| 6,477,030 B1 | 11/2002 | Hidaka et al. |
| 7,042,700 B1 | 5/2006 | Hidaka et al. |
| 2005/0133240 A1 | 6/2005 | Hidaka et al. |
| 2006/0044732 A1* | 3/2006 | Shimizu et al. ........... 361/303 |

FOREIGN PATENT DOCUMENTS

| JP | 04357806 | 12/1992 |
| JP | 5101975 | 4/1993 |
| JP | 05109580 | 4/1993 |
| JP | 05109581 | 4/1993 |
| JP | 5135991 | 6/1993 |
| JP | 05299290 | 11/1993 |
| JP | 06163315 | 6/1994 |

(Continued)

*Primary Examiner*—Eric W. Thomas
(74) *Attorney, Agent, or Firm*—Stevens, Davis, Miller & Mosher, LLP

(57) ABSTRACT

A multilayer capacitor including a base body, which is a dielectric substance; and a plurality of electrode layers, which is laminated in the base body and has a plurality of divided electrodes, in which there are at least three or more kinds of electrode layers having different number of electrodes, and the electrode layer having the most electrodes is interposed between the other electrode layers. The multilayer capacitor achieves high withstand voltage and high reliability with no damage to the size reduction and high capacitance of the capacitor and a mold capacitor having the multilayer capacitor built-in.

17 Claims, 13 Drawing Sheets

FOREIGN PATENT DOCUMENTS

| | | |
|---|---|---|
| JP | 06196348 | 7/1994 |
| JP | 2000216045 | 8/2000 |
| JP | 2001110691 | 4/2001 |
| JP | 2001284157 | 10/2001 |
| JP | 200225852 | 1/2002 |
| JP | 2002043166 | 2/2002 |
| JP | 2002043170 | 2/2002 |
| JP | 2002308671 | 10/2002 |
| JP | 2002313669 | 10/2002 |
| JP | 2003007561 | 1/2003 |
| JP | 2005183434 | 7/2005 |
| JP | 2005183574 | 7/2005 |
| JP | 2005197627 | 7/2005 |
| JP | 2005213126 | 8/2005 |

* cited by examiner

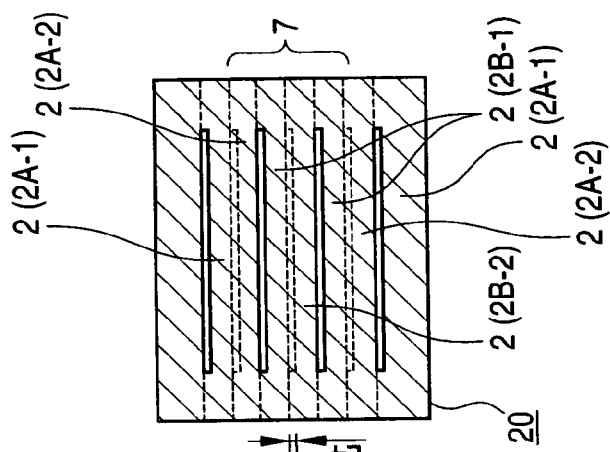
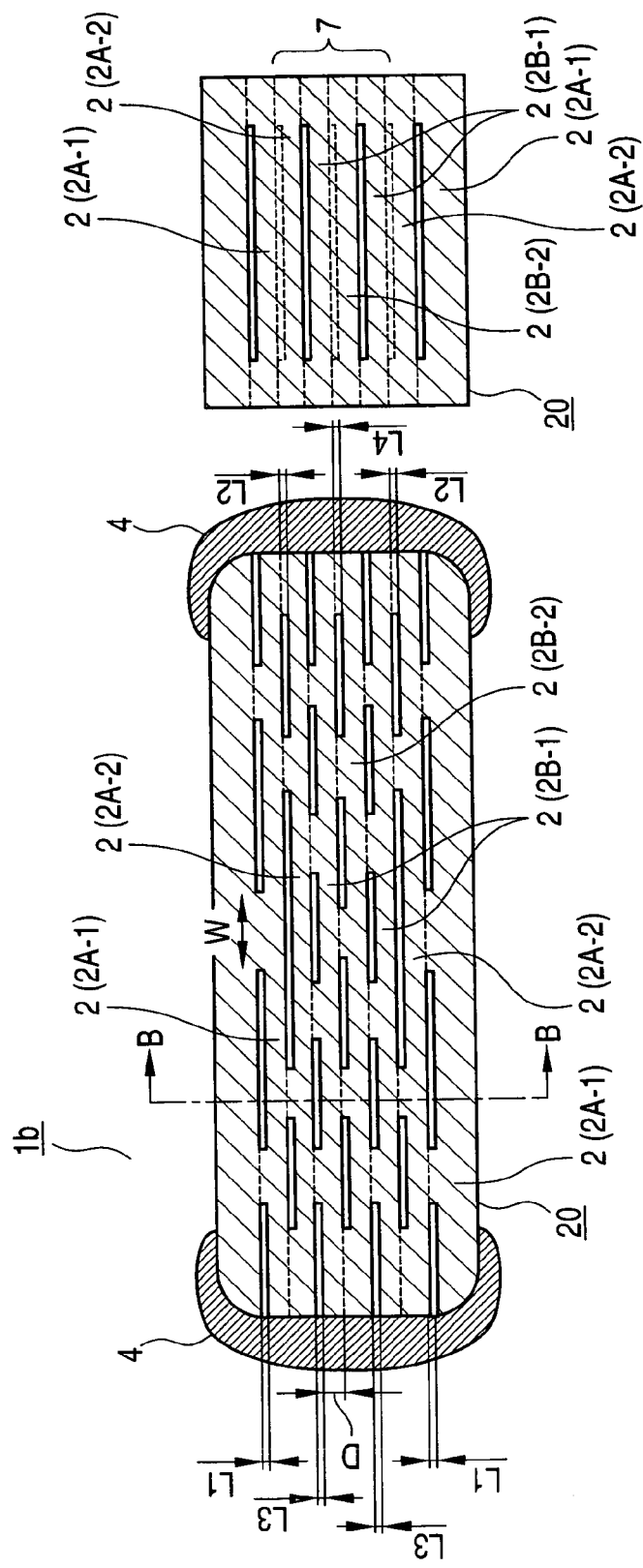

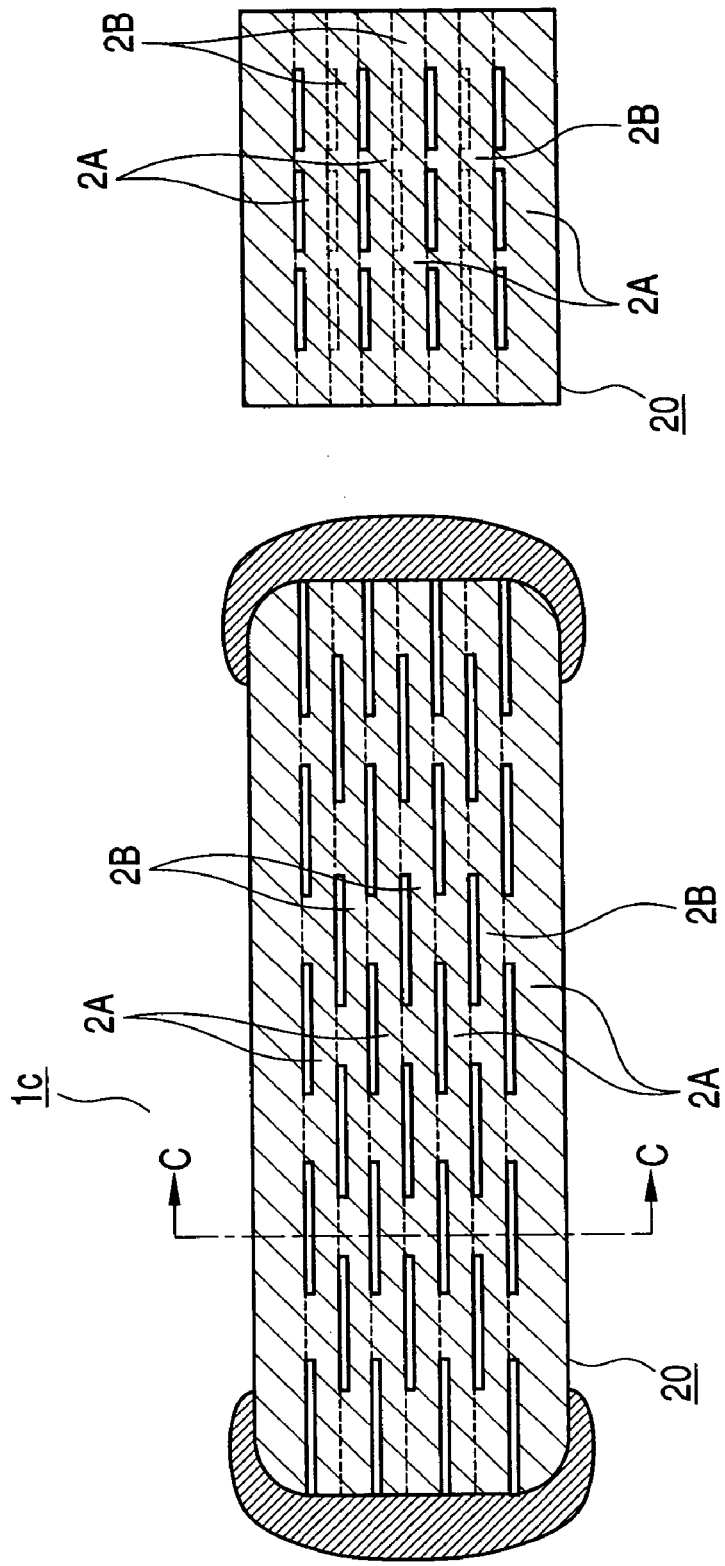

MULTILAYER CAPACITOR AND MOLD CAPACITOR

BACKGROUND

The present invention relates to a multilayer capacitor, in which a plurality of dielectric substrates having internal electrodes on the main surfaces thereof are laminated and capacitance is generated between the facing internal electrodes, and a mold capacitor having the multilayer capacitor built-in.

In an electronic device such as power supply, modem or the like, it is common to use a capacitor with a plurality of electronic parts in order to remove noise or to cut direct current. Following the rapid globalization in recent years, the size and cost reduction of an electronic device is highly demanded, and, accordingly, the size and cost reduction of electronic parts is also highly demanded. In addition, since the automatic mounting reduces cost and mounting area, surface-mount electronic parts are also highly demanded. Furthermore, incompatible features such as high performance, the reduction of feature fluctuation, the improvement of durability or the like are also highly demanded. Particularly, since a capacitor is widely used for the power supply or noise removal of plasma display, large-scaled liquid crystal display or the like, the high capacitance and high withstand voltage of the capacitor is also demanded.

FIG. 13(a) is a side cross-sectional view of a multilayer capacitor in the related art. FIG. 13(b) is a cross sectional view of the multilayer capacitor taken along the line G—G in FIG. 13(a). The multilayer capacitor 100 includes a multilayer body 110 formed of a plurality of laminated dielectric substrates 101. A plurality of divided internal electrode 102 is formed on the main surface of each dielectric substrate 101 forming the multilayer body 110. The multilayer body 110 is formed substantially in a cuboid, and a pair of external electrodes 103 is provided at both side surfaces, which face each other in the longitudinal direction of the multilayer body 110.

The multilayer capacitor 100 is formed by laminating a plurality of dielectric substrates 101, and the internal electrodes 102 are formed on the dielectric substrates 101 by screen printing, decalcomania, paste application or the like. That is, the dielectric substrates 101 having the internal electrodes 102 on the surface thereof are laminated so as to form the multilayer body 110.

In the multilayer capacitor 100 constructed as above, capacitance is generated between the layers of internal electrode 102 formed on the different dielectric substrates 101, and the summed capacitance contributes to the high capacitance of the capacitor (for example, see JP-A-2001-284157).

In addition, if voltage is applied to the multilayer capacitor 100 constructed as above, stress caused by piezoelectric effect is generated at certain portions. The stress is biggest in the vicinity of the central portion of the multilayer capacitor 100. Therefore, the stress influences most in the vicinity of the central portion of the multilayer body 110. In order to improve the withstand voltage of the multilayer capacitor 100, it is required to improve the withstand voltage of the multilayer capacitor in the vicinity of the central portion. Furthermore, what make the capacitor weak to the stress in the improvement of withstand voltage is, firstly, the voltage applied to the portions between the adjacent internal electrodes 102 formed on the main surface of the same dielectric substrate 101, and, secondly, the voltage applied to the portions between the adjacent internal electrodes 102 formed on the dielectric substrates 101 overlapped in the laminating direction.

However, in the multilayer capacitor in the related art, the internal electrodes 102 are formed on the main surface of each dielectric substrate 101 at regular intervals with interelectrode distance W therebetween. Therefore, the interelectrode distance W between the adjacent internal electrodes 102 formed on the same dielectric substrate 101 is equal throughout the multilayer capacitor 100. In addition, since each laminated dielectric substrate 101 has the same thickness, the interval between the internal electrodes 102, which are formed on the different dielectric substrates 101 and adjacent in the laminating direction, is also equal in the laminating direction.

Due to the above fact, when a certain voltage is applied to the multilayer capacitor 100, there occurs a difference between the withstand voltage in the vicinity of the central portion of the multilayer capacitor 100, which is the weakest portion to stress, and the withstand voltage in the other portions. In addition, the withstand voltage in the vicinity of the central portion, which is the weakest portion to stress, becomes the withstand voltage of the multilayer capacitor 100. As a result, there is a case that cracks are caused in the internal electrode due to the stress caused by the piezoelectric effect. Furthermore, there has been a problem in that countermeasures for achieving the high withstand voltage and high reliability have never been devised sufficiently.

In order to solve the above problem, it is possible to improve the withstand voltage by increasing the area of the main surface and the thickness of the main surface of the dielectric substrate 101. However, in this case, the size of the multilayer capacitor 100 increases, which is incompatible with the recent trend requiring the size reduction of a device. As a result, it is demanded to develop a multilayer capacitor capable of improving the withstand voltage and achieving the high capacitance with no size increase.

SUMMARY

The advantage of the present invention is to provide a multilayer capacitor capable of solving the above problem and achieving high withstand voltage and high reliability with no damage to the size reduction and high capacitance of the capacitor and a mold capacitor having the multilayer capacitor built-in.

In order to solve the above problem and to achieve the above advantage, a multilayer capacitor according to the present invention is a multilayer capacitor including a base body, which is a dielectric substance; and a plurality of electrode layers which is laminated in the base body, each of the plurality of electrode layers has a plurality of electrodes which are separated each other, in that there are at least three or more kinds of electrode layers having different number of electrodes, and a kind of electrode layer having the most electrodes is interposed between the other kinds of electrode layers.

In the present invention, since the number of divided electrodes is large at portions, to which large stress is applied due to piezoelectric effect, the stress due to the piezoelectric is reduced and the withstand voltage is improved with no increase of the area of the internal electrode. As a result, the high capacitance of the multilayer capacitor can be achieved while the size of the multilayer capacitor is sought to decrease.

BRIEF DESCRIPTION OF THE DRAWINGS

FIG. 3 is a cross-sectional view of a mold capacitor having the multilayer capacitor of the embodiment built-in.

FIG. 4(a) is a side cross-sectional view of the multilayer capacitor according to the second embodiment of the invention.

FIG. 4(b) is a cross-sectional view of the multilayer capacitor taken along the line B—B in FIG. 4(a).

FIG. 5(a) is a side cross-sectional view of the multilayer capacitor according to a third embodiment of the invention.

FIG. 5(b) is a cross-sectional view of the multilayer capacitor taken along the line C—C in FIG. 5(a).

DETAILED DESCRIPTION

Figure 1:
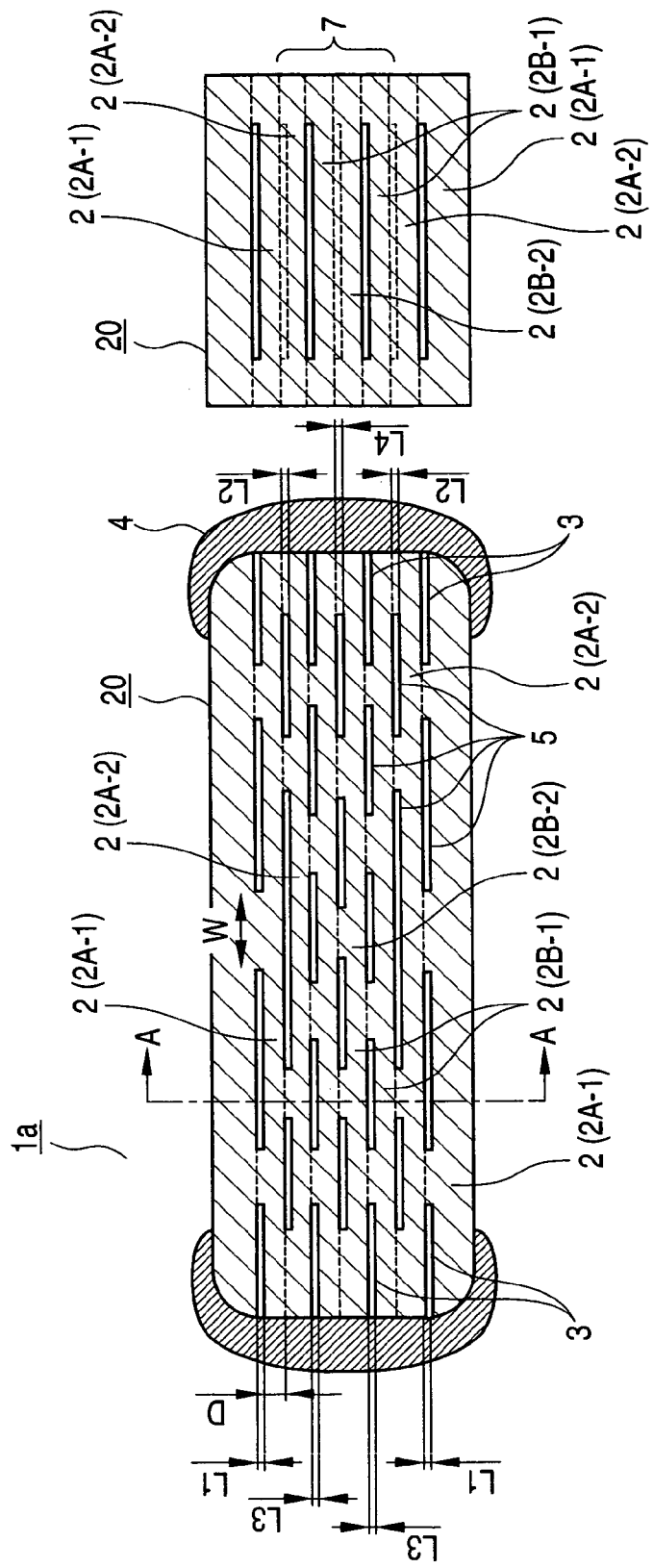
FIG. 1(a) is a side cross-sectional view of a multilayer capacitor according to a first embodiment of the present invention.
FIG. 1(b) is a cross-sectional view of the multilayer capacitor taken along the line A—A in FIG. 1(a).

Hereinafter, the invention will be described with reference to the drawings.

(First Embodiment)

FIG. 1(a) is a side cross-sectional view of a multilayer capacitor according to a first embodiment of the present invention, and FIG. 1(b) is a cross-sectional view of the multilayer capacitor taken along the line A—A in FIG. 1(a). FIG. 2(a) is a view showing the shape of internal electrodes formed on a first dielectric substrate 2A-1; FIG. 2(b) is a view showing the shape of the internal electrodes formed on a second dielectric substrate 2A-2; FIG. 2(c) is a view showing the shape of the internal electrodes formed on a third dielectric substrate 2B-1; and FIG. 2(d) is a view showing the shape of the internal electrodes formed on a fourth dielectric substrate 2B-2. In the drawings, the multilayer capacitor 1a includes a base body 20 formed of four kinds of rectangular plate-like dielectric substrates 2 (reference numerals such as 2A-1, 2A-2, 2B-1, and 2B-2 will be used together), which are laminated one after another. A plurality of divided internal electrodes 3 and 5 is formed on a main surface of the dielectric substrate 2.

Meanwhile, even though the specification describes the forming pattern of internal electrode consisting of four kinds such as FIG. 2(a) to (d), the forming pattern is not limited thereto, and any forming pattern can be taken if the forming pattern consists of three or more kinds. Furthermore, in the specification, an electrode freely connected to a lead terminal is called 'external electrode', and an electrode formed in the base body, which is a dielectric substance, is called 'internal electrode'.

As shown in FIG. 2(a) to 2(d), there are two kinds of internal electrodes, that is, a drawing electrode 3 extending to the end from a certain position on the substrate and a floating electrode 5 surrounded with insulator so as to contact with no conductor. In addition, there are four kinds of dielectric substrates (2A-1, 2A-2, 2B-1, and 2B-2) which can be classified by the forming pattern and number of the drawing electrodes 3 and the floating electrodes 5, that is, two drawing electrodes 3 and two floating electrodes 5 are formed on the main surface of the first dielectric substrate 2A-1 as shown in FIG. 2(a). Three floating electrodes 5 are formed on the main surface of the second dielectric substrate 2A-2 as shown in FIG. 2(b). Two drawing electrodes 3 and three floating electrodes 5 are formed on the main surface of the third dielectric substrate 2B-1 as shown in FIG. 2(c). Four floating electrodes 5 are formed on the main surface of the fourth dielectric substrate 2B-2 as shown in FIG. 2(d). That is, even in the dielectric substrates 2, on which the drawing electrodes 3 and the floating electrodes 5 are formed in the same manner, the internal electrode is divided further at the third dielectric substrate 2B-1 than at the first dielectric substrate 2A-1. Likewise, in the dielectric substrate 2, on which only floating electrodes 5 are formed, the internal electrode is divided further at the fourth dielectric substrate 2B-2 than at the second dielectric substrate 2A-2.

In addition, the third dielectric substrate 2B-1 and the fourth dielectric substrate 2B-2 having large number of divided internal electrodes are laminated alternately at the central portion 7 of the base body 20 in the laminating direction. On the other hand, the first dielectric substrate 2A-1 and the second dielectric substrate 2A-2 having small number of divided internal electrodes are laminated mutually at the end portions of the base body 20 in the laminating direction (the top and bottom portions in FIG. 1). That is, in the base body 20 of the first embodiment, the number of divided internal electrodes on the main surface of the dielectric substrate 2 is large at the central portion 7 in the laminating direction and small at the end portions in the laminating direction.

Figure 2:
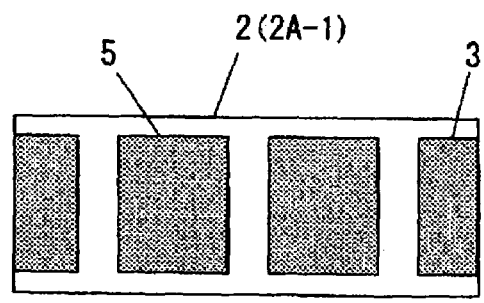
FIG. 2(a) is a view showing the shape of internal electrodes formed on a first dielectric substrate 2A-1.
FIG. 2(b) is a view showing the shape of the internal electrodes formed on a second dielectric substrate 2A-2.
FIG. 2(c) is a view showing the shape of the internal electrodes formed on a third dielectric substrate 2B-1.
FIG. 2(d) is a view showing the shape of the internal electrodes formed on a fourth dielectric substrate 2B-2.
Figure 2:
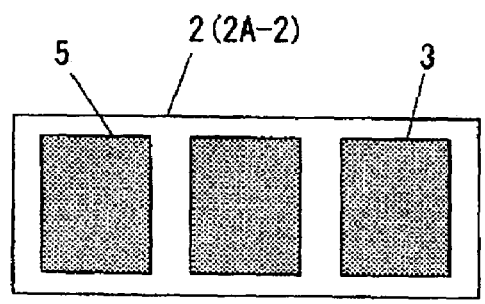
Figure 2:
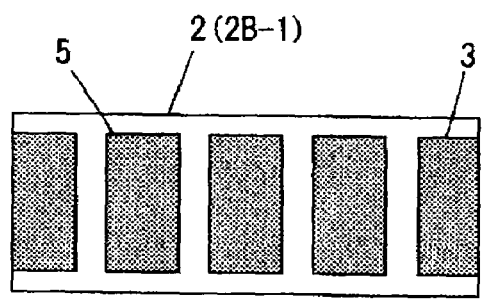
Figure 2:
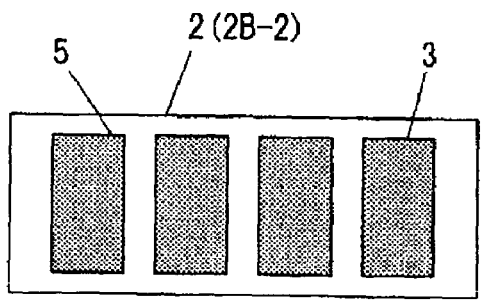

As shown in FIG. 1, the multilayer capacitor 1a includes four electrode layers L1, L2, L3 and L4. The electrode layer L1 is formed of the internal electrodes 3 and 5 formed on the first dielectric substrate 2A-1. That is, the electrode layer L1 has four electrodes. The electrode layer L2 is formed of the internal electrodes 3 and 5 formed on the second dielectric substrate 2A-2. That is, the electrode layer L2 has three electrodes. The electrode layer L3 is formed of the internal electrodes 3 and 5 formed on the third dielectric substrate 2B-1. That is, the electrode layer L3 has five electrodes. The electrode layer L4 is formed of the internal electrodes 3 and 5 formed on the fourth dielectric substrate 2B-2. That is, the electrode layer L4 has four electrodes.

The electrode layer L2 includes three electrodes. The electrode layers L1 and L4 include four electrodes. The electrode layer L3 includes five electrodes. Herein, if the electrode layers having the same number of electrodes are classified into the same kind, and the electrode layers having different number of electrode are classified into different kinds, the multilayer capacitor 1a according to the first embodiment includes three kinds of electrode layers. In addition, the electrode layer having the most electrodes is the electrode layer L3, and the electrode layer L2 is interposed between the electrode layers L2 and L4. Meanwhile, the first embodiment described the multilayer capacitor 1a including three kinds of electrode layers, the invention can be applied to any multilayer capacitor including three or more kinds of electrode layers.

The base body 20 is formed substantially in a cuboid, and a pair of external electrodes 4 is provided at both side surfaces facing each other in a first direction, which is a longitudinal direction. The drawing electrodes 5 formed on the first dielectric substrate 2A-1 and the third dielectric substrate 2B-1 are connected to the external electrodes 4 at the end portions of the substrate. Meanwhile, 'a direction perpendicular to the laminating direction' includes two directions, that is, longitudinal direction and lateral direction if the base body 20 is formed substantially in a cuboid. 'The longitudinal direction perpendicular to the laminating direction' is used when the longitudinal direction is represented, and 'the lateral direction perpendicular to the laminating direction' is used when the lateral direction is represented.

The multilayer capacitor 1a constructed as above can realize a considerably high capacitance consisting of the summed capacitance generated between the internal electrodes 3 and 5. That is, if the shape, size and material are equal, the multilayer capacitor has larger capacitance than a single-layered capacitor.

The superior withstand voltage of the multilayer capacitor 1a according to the embodiment will be described. In the multilayer capacitor 1a, voltage is generated strongly between the internal electrodes in the vicinity of the central portion 7 in the laminating direction and in the vicinity of the central portion of the lateral direction perpendicular to the laminating direction. The generated voltage causes a stress to the internal electrodes due to the piezoelectric effect. As a result, the withstand voltages required at the central portion 7 and the other portions are different. The stress may cause cracks in the internal electrodes.

Generally, in order to improve the withstand voltage, the dielectric substrate 2 is made thick, or the internal electrodes are divided, which leads to divide the voltage generated at both ends so as to improve the withstand voltage. If the number of divided internal electrodes increases, the number of divided voltage also increases, and thus the withstand voltage can also be improved.

In the first embodiment, the number of divided internal electrodes 3a formed on the dielectric substrate 2 in the vicinity of the central portion 7 is larger than the number of divided internal electrodes 3 in the portions other than the central portion 7. As described above, since the number of divided internal electrodes increases previously in the vicinity of the central portion 7, at which stress caused by piezoelectric effect becomes stronger, the stress applied to the dielectric substrate 2 can be relieved. The above effect can be realized by laminating the dielectric substrate 2 (2B-1, 2B-2) having a large number of divided internal electrodes at the central portion in the laminating direction and the dielectric substrate 2 (2A-1, 2A-2) having a small number of divided internal electrodes at the end portions in the laminating direction when the dielectric substrates 2 (2A-1, 2A-2, 2B-1, 2B-2) having the internal electrodes divided into different numbers previously are laminated so as to form the multilayer capacitor 1a, as shown in FIGS. 2(a) to (d).

In addition, it is preferable that the number of divided internal electrodes be not only large at the central portion 7, but also increase gradually from the end portions to the central portion in the laminating direction. With the above configuration, the number of divided internal electrodes 3 and 5 can be balanced according to the applying manner of stress, and, consequently, the multilayer capacitor can cope with the withstand voltage with good balance entirely.

Next, the improvement of the withstand voltage between the internal electrodes 3 facing each other in the laminating direction will be described. For example, if the thickness D of each dielectric substrate 2 to be laminated is varied previously (FIG. 1(a)), and thick dielectric substrates 2 are laminated in the vicinity of the central portion 7 in the laminating direction, on the other hand, thin dielectric substrates 2 are laminated at the end portions in the laminating direction, the withstand voltage can be improved.

With the above laminating manner, the withstand voltage between the facing internal electrodes 3 and 5 is strengthened in the vicinity of the central portion 7, to which stress is strongly applied, and the withstand voltage, which is entirely balanced, can be realized. That is, the withstand voltage between the internal electrodes formed on different dielectric substrates 2 can be improved.

Meanwhile, even though the dielectric substrates 2 having a large number of divided internal electrodes and the thick dielectric substrates 2 are arranged at the central portion 7 in the laminating direction in the first embodiment, a desired effect can be obtained even when the dielectric substrates 2 having a large number of divided internal electrodes and the thick dielectric substrates 2 are arranged at the central portion 7 in the laminating direction, of which the width is further increased in the laminating direction. As described above, since how far from the central portion the withstand voltage improved dielectric substrate 2 will be provided depends on the type, shape and size of the multilayer capacitor, it should be determined properly.

The dielectric substrate 2 is a substrate made of a dielectric substance and preferably made of dielectric materials such as titanium dioxide, solid solution of calcium titanate and strontium titanate, barium titanate or the like. In addition, a low permittivity material such as alumina or the like is also used. From the above dielectric material such as oxide dielectric material, metal dielectric material or ceramic dielectric material, proper material or composition is selected according to the desired permittivity (the permittivity can control the size of capacitance), element strength or the like. Furthermore, the above materials are mixed with organic material or the like so as to be molded into a certain shape according to the necessity. After that, the mixture is sintered by heat treatment or the like according to the necessity so as to form a substrate shape.

Since the dielectric substrate 2 is the criterion of the base body 20 in the multilayer capacitor 1a, the dielectric substrate 2 has a shape suitable for the size or shape of the multilayer capacitor 1a. For example, as shown in FIGS. 2(a) to (d), the dielectric substrate 2 is a rectangular plate having long sides in the direction of the external electrodes 4. If the dielectric substrate 2 is a flat plate, any shape can be taken. In addition, the edge portions of the dielectric substrate 2 can be removed in order to improve the durability. Particularly, if the edge portions of the dielectric substrate 2 laminated at the end portions are removed, the breakdown or damage occurring in manufacturing, carrying and installing can be prevented, and the impact strength can be improved.

Meanwhile, it is preferable that the dielectric substrates 2 having different thickness D be molded previously and then laminated. For example, it is preferable that the thin dielectric substrates 2 be laminated near the end portions in the laminating direction of the multilayer capacitor 1a and the thick dielectric substrates 2 be laminated at the central portion in the laminating direction. In this case, since the thickness of the dielectric substrate 2 is larger at the central portion 7, to which stress is strongly applied, than the other portions, the durability to the stress applied to the facing internal electrodes 3 and 5 is improved, and the multilayer capacitor 1a can cope with stress with good balance entirely.

The internal electrodes 3 and 5 are thin film-like electrodes formed on the dielectric substrate 2 and formed on the surface of each plate-like dielectric substrate 2, which is a unit of laminating. The internal electrodes 3 and 5 are made of metal material or alloy including at least one of Ni, Ag, Pd, Cu, Au or the like. Particularly, it is advantageous in terms of the cost to use Ni or Ni alloy. In addition, the internal electrodes 3 and 5 can be made of the alloy of the above materials or the plated materials. It is needless to say that the internal electrodes 3 and 5 can be made of alloys. Furthermore, the thickness of the internal electrodes 3 and 5 is preferably in the range of 1 to 5 μm. If the thickness of the internal electrodes 3 and 5 is less than 1 μm, the internal electrodes 3 and 5 are easily cut, and the capacitance decreases. As a result, the capacitance balance in the same electrode layer deteriorates, and the withstand voltage tends to decrease. If the thickness of the internal electrodes 3 and 5 is more than 5 μm, the fixing strength of the dielectric substrates 2 becomes insufficient or the gap becomes too wide when the dielectric substrates 2 are laminated, therefore, the laminating strength becomes insufficient.

In addition, the internal electrodes 3 and 5 can be formed by decalcomania-producing electrodes, which are made by forming the above materials or the like on a transcriptional body, on the surface of the dielectric substrate 2. In the decalcomania, the solvent in the paste does not damage the dielectric substrate 2, thereby preventing the withstand voltage from deteriorating. Furthermore, the internal electrodes 3 and 5 can be formed by applying metal paste or the like directly on the surface of the dielectric substrate 2. Still furthermore, the internal electrodes 3 and 5 can be formed by deposition or plating. Still furthermore, the internal electrodes 3 and 5 can be formed by screen-printing on the surface of the dielectric substrate 2. In this case, it should be careful not to break the dielectric substrate 2. The forming method of the internal electrodes 3 and 5 can be determined on the basis of the specification about shape or area and the thickness precision of the desired internal electrodes 3 and 5, the durability, and the affinity between the materials of the dielectric substrate 2 and the internal electrodes 3 and 5.

In addition, it is preferable that the plurality of internal electrodes 3 and 5 forms a series and parallel circuit on the surface of the dielectric substrate 2 in the multilayer capacitor as shown in FIGS. 1(a), 1(b), and 2(a) to (d). The above formation of the internal electrodes 3 and 5 divides voltage stress so as to improve the withstand voltage. In the formation, the internal electrodes 3 and 5 formed on the surfaces of the plurality of dielectric substrates 2 in a certain layer includes the internal electrodes 3 and 5 connected to the external electrodes 4, and the plurality of internal electrodes 3 and 5 formed on the surface of the dielectric substrates 2 in the next layer is not connected to the external electrodes 4. As a result, the internal electrodes 3 formed on the dielectric substrates 2 laminated in the laminating direction face each other, and only one of the facing internal electrodes 3 is connected to the external electrodes 4. Therefore, potential difference is generated between the facing internal electrodes 3 if voltage is applied to the external electrodes 4, and consequently, capacitance is generated between the facing area internal electrodes 3. In this case, since the plurality of layers are laminated, and the plurality of internal electrodes 3 is formed on the surface of the dielectric substrate 2, there can be portion, in which a plurality of capacitance can be generated, and consequently, the multilayer capacitor 1a can obtain a large amount of capacitance.

If the internal electrodes 3 are divided on the surface of the dielectric substrate 2, the withstand voltage is further improved at the dielectric substrate 2 having a large inter-electrode distance W between the adjacent internal electrodes than at the dielectric substrate 2 having a small inter-electrode distance W between the adjacent internal electrodes, however, the electrode area decreases, therefore, the capacitance decreases. In addition, even though the withstand voltage is improved if the number of divided internal electrode is large when the internal electrodes 3 are divided on the surface of the dielectric substrate 2, the capacitance decreases. The durability of the multilayer capacitor 1a can be increased by applying the above principle to the electrical distortion centralized at the central portion of the height, width and length directions of the multilayer capacitor.

The external electrodes 4 are provided to apply voltage to the multilayer capacitor 1a and formed at the external surface of the base 20. Meanwhile, the external electrodes 4 are made of metal materials or alloys including at least one of Ni, Ag, Pd, Cu, Au or the like such as the internal electrodes 3. Particularly, it is advantageous in terms of the cost to use Ni or Ni alloy. In addition, the external electrodes 4 can be made of the alloys of the above materials or the plated materials. It is needless to say that the external electrodes 4 can be made of alloys or the like. Furthermore, the external electrodes can be formed by a process such as deposition, paste, printing, plating or the like or by laminating the dielectric substrates 2, at the edge portions of which the external electrodes are formed. Still furthermore, the external electrodes 4 can be formed at the edge portions of the previously laminated dielectric substrates 2.

The inter-electrode distance W is, as described in the part of the internal electrodes 3 and 5, the distance between the adjacent internal electrodes and varies with the durability against the applied voltage, that is, the withstand voltage varies with the size of the inter-electrode distance W.

The central portion 7 is near the central portion in the laminating direction of the dielectric substrate 2 of the multilayer capacitor 1a, and voltage stress is generated most strongly at the central portion 7. As a result, the withstand voltage shape required at the end portions of the laminating direction, that is, portions other than the central portion 7 is different from the withstand voltage shape required in the vicinity of the central portion 7, and if the both shapes are balanced, the withstand voltage of the multilayer capacitor 1a can be improved.

Figure 3:
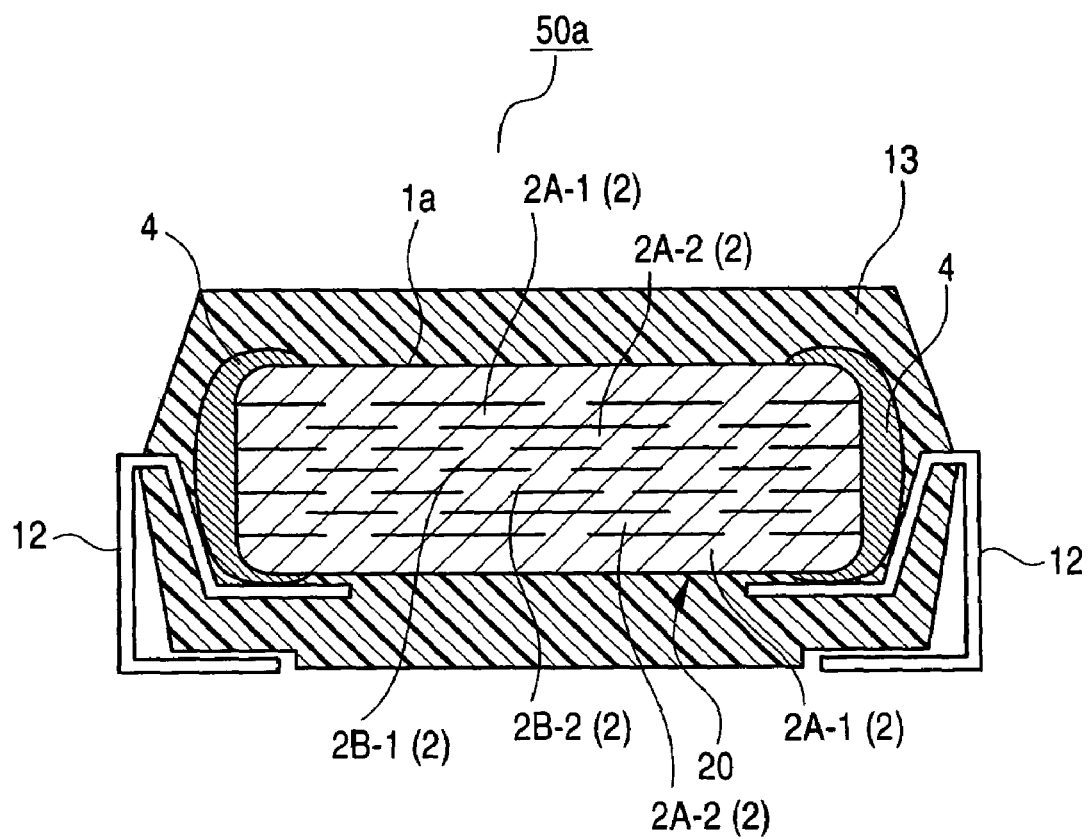

FIG. 3 is a cross-sectional view of a mold capacitor having the multilayer capacitor of the embodiment built-in. In the mold capacitor 50a, the multilayer capacitor 1a is sealed with an exterior material 13, that is, the multilayer capacitor 1a is blocked from the exterior, which leads to the improvement of impact-resistance, humidity-resistance as well as withstand voltage of the multilayer capacitor 1a. In addition, since lead terminals 12 project from the exterior material 13, the distance between the lead terminals 12 elongates, therefore, the withstand voltage improves. Furthermore, since the exterior material 13 blocks the multilayer capacitor 1a from the exterior, the multilayer capacitor 1a becomes strong to contamination, fracture or the like.

Meanwhile, the lead terminals 12 can project from the side or bottom surface of the exterior material 13. If the lead terminals 12 project from the side or bottom surface, a sufficient space is generated between the exterior material 13 and the lead terminal 12, therefore, the deflection-resistance in installation can be improved.

The exterior material 13 seals a part of lead terminal 12 and the entire multilayer capacitor 1a, and is commonly made of epoxy resin such as O-cresol-novolac, biphenyl, pentadiene or the like. It is needless to say that materials other than the above can be mixed and the exterior material 13 can be made of cheaper resin. In addition, the withstand voltage of the external coating can be improved by making the minimum gap between the surface of the exterior material 13 and the surface of the multilayer capacitor 1a (at the thin portion, the exterior material 13 is the thickest) 0.1 mm or more. Furthermore, electronic parts having strong withstand voltage, humidity-resistance and heat-resistance can be manufactured.

In addition, even though it is general that the exterior material 13 takes a form of substantial cuboid, substantial cubic or the like, the edge portions of the exterior material 13 can be removed or form circular arc portions, recessed portion or the like. In addition, the exterior material 13 forms a trapezoid column, the side cross-sectional surface of which takes a form of trapezoid. Furthermore, the exterior material 13 can take a form of an oval column and combination of the distinguished portions or the like of the above shapes. The above shapes can improve the impact-resistance or the like of the exterior material 13.

As described above, in the first embodiment, since the number of divided internal electrodes is large at a portion, to which stress in the laminating direction of the dielectric substrate of the laminating body is generated strongly, the stress caused by piezoelectric effect is reduced and the withstand voltage is improved with no area increase of the internal electrodes. As a result, the high withstand voltage can be realized while the size of the multilayer capacitor is sought to decrease and cracks in the internal electrodes are prevented from causing.

(Second Embodiment)

FIG. 4(a) is a side cross-sectional view of the multilayer capacitor according to the second embodiment of the invention, and FIG. 4(b) is a cross-sectional view of the multilayer capacitor taken along the line B—B in FIG. 4(a). The multilayer capacitor in FIG. 4 has the same elements as those of the multilayer capacitor in FIG. 1 except the thickness D of the substrate in the vicinity of the central portion 7, therefore, the same reference numerals refer to the same elements, and the description for them will be omitted.

In the multilayer capacitor 1b of the second embodiment, the dielectric substrate 2 having a large inter-electrode distance W is arranged in the vicinity of the central portion 7 and the thick dielectric substrate 2 is arranged in the vicinity of the central portion 7.

As described above, in the second embodiment, the improvement of the withstand voltage is sought, and the stress caused by piezoelectric effect is reduced.

(Third Embodiment)

Figure 6:
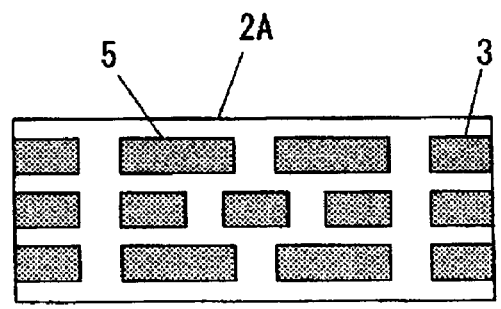
FIG. 6(a) is a view showing the shape of the internal electrodes formed on the dielectric substrate 2A.
FIG. 6(b) is a view showing the shape of the internal electrodes formed on the dielectric substrate 2B.
Figure 6:
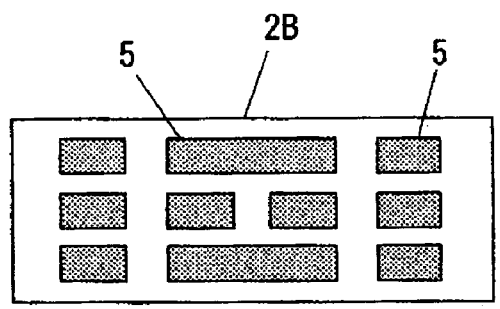

FIG. 5(a) is a side cross-sectional view of the multilayer capacitor according to a third embodiment of the invention, and FIG. 5(b) is a cross-sectional view of the multilayer capacitor taken along the line C—C in FIG. 5(a). FIG. 6(a) is a view showing the shape of the internal electrodes formed on the dielectric substrate 2A, and FIG. 6(b) is a view showing the shape of the internal electrodes formed on the dielectric substrate 2B.

In the multilayer capacitor 1c shown in FIGS. 5(a), 5(b), 6(a) and 6(b), the internal electrodes 3 and 5 are divided into two or more pieces on the substrate in the lateral direction perpendicular to the laminating direction (divided into three pieces in the third embodiment); a plural column (three columns in the third embodiment) of internal electrodes extending in the longitudinal direction is formed, and the number of divided internal electrodes is larger at the central portion in the lateral direction perpendicular to the laminating direction than at the other portions. As a result, the withstand voltage of the central portion in the lateral direction also can be improved.

As described above, in the third embodiment, since the internal electrodes formed on the main surface of the same dielectric substrate are divided in the direction perpendicular to the laminating direction, the voltage applied to the portion between the external electrodes of the multilayer capacitor can be divided as many as the number of divided internal electrodes. Therefore, the withstand voltage can be improved by increasing the number of divided internal electrodes for strong stress generated due to piezoelectric effect in the vicinity of the central portion in the laminating direction. As a result, the withstand voltage can be leveled throughout the multilayer capacitor, therefore, the multilayer capacitor can cope with reducing stress, and thus the withstand voltage can be improved. In addition, it is preferable that the number of divided internal electrodes be larger at the central portion 7 of the laminating direction than the other portions, and the number of divided internal electrodes be larger at the central portion of the direction perpendicular to the laminating direction than the other portions.

As described above, the withstand voltage can be optimized entirely, and the withstand voltage can be improved to the maximum with no change in the shape or size of the multilayer capacitor by varying the number of divided internal electrodes 3 and 5 with stress, and thus varying the thickness of the dielectric substrate 2 (increasing the number of divided internal electrodes and the thickness of the substrate in the vicinity of the central portion 7, to which stress is strongly applied).

(Fourth Embodiment)

Figure 7:
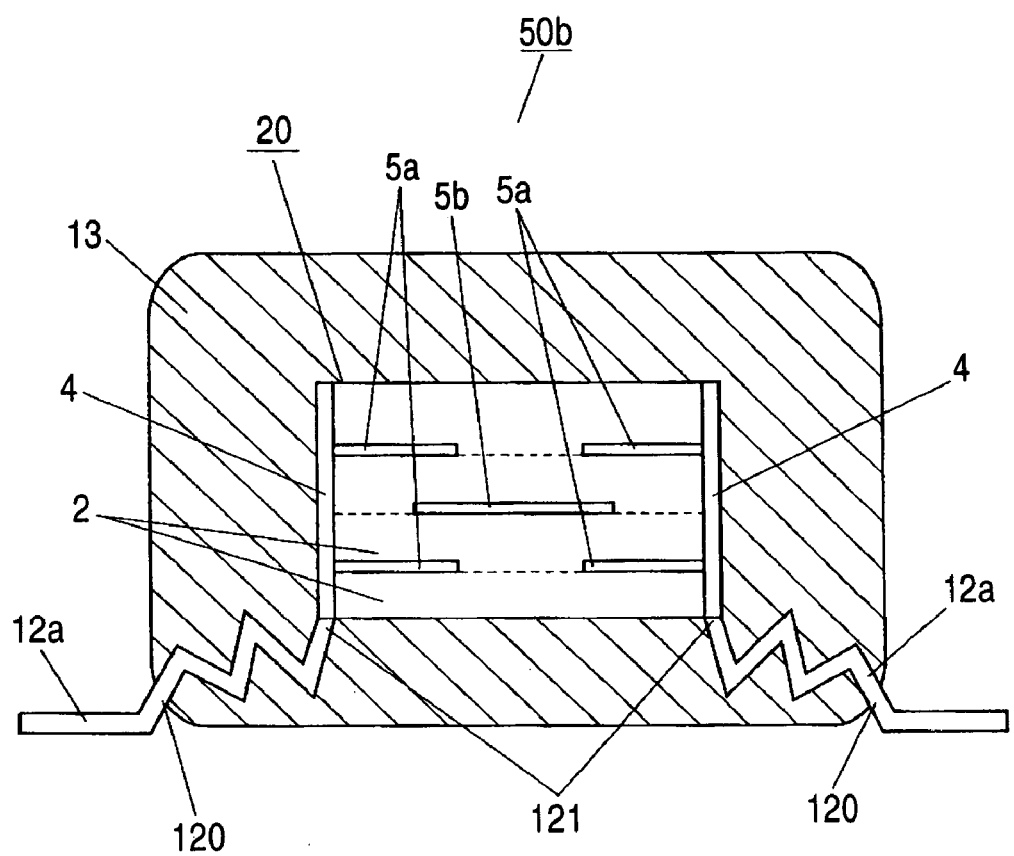
FIG. 7 is a side cross-sectional view of a mold capacitor 50b of a fourth embodiment according to the invention.

FIG. 7 is a side cross-sectional view of a mold capacitor 50b of a fourth embodiment according to the invention. In FIG. 7, the reference numeral 50b is the mold capacitor, the reference numeral 2 is the dielectric substrate, the reference numeral 4 is the external electrode, the reference numeral 12 is the lead terminal, the reference numeral 13 is a sealing material (exterior material), the reference numeral 5 is the internal electrode, and the reference numeral 20 is the basically constructed base body. The mold capacitor 50b includes the multilayer capacitor formed of the base body 20, which is formed by laminating the plurality of rectangular plate-like dielectric substrates 2. In addition, the plurality of divided internal electrodes is formed on the main surface of the dielectric substrate 2.

There are two kinds of internal electrode, that is, a drawing electrode 5a extending to the end of the dielectric substrate 2 and a floating electrode 5b surrounded with insulator. In addition, there are two kinds of dielectric substrate 2, that is, a dielectric substrate having the drawing electrodes 6a and the floating electrodes 6b on the main surface and a dielectric substrate having only the floating electrodes 6b on the main surface. Furthermore, the above two kinds of dielectric substrates are laminated alternatively so as to form the base body 20.

The base body 20 is substantially formed in a cuboid, and a pair of external electrodes 4 is provided at two side surfaces facing each other in the first direction, which is the longitudinal direction. The drawing electrodes 5a formed on the dielectric substrate 2 are connected to the external electrodes 4 at the edge portions of the dielectric substrate 2.

A pair of lead terminals 12a is connected to the pair of external electrodes 4. A sealing material 13 seals the whole base body 20 and a part of the lead terminals 12a and 12b. In addition, the lead terminals 12a and 12b of the fourth embodiment bend repeatedly in the sealing member 13 so as to make the portions from connecting ends 121 connected to the external electrodes 4 to exposing ends 120 exposed through the sealing material 13 longer than the straight distance from the connecting end 121 to the exposing end 120. That is, the lead terminals 12a and 12b meander.

In the mold capacitor 50b configured as above, the length of the lead terminal 12a from the portion exposed to the external environment to the portion connected to the base 20 can be increased, therefore, moisture intruding into the base body 20 along the surface of the lead terminal 12a can be suppressed. As a result, electronic parts having improved humid-resistance, durability and withstand voltage can be manufactured.

Meanwhile, even though the mold capacitor 50b of the fourth embodiment is mounted with the multilayer capacitor formed of the base body 20 as base body, the base body is not limited to the multilayer capacitor, and, for example, a single-layered capacitor can be mounted. In addition, besides the capacitor, even when electronic elements such as resistance, inductor, filter or the like are mounted, the same effect can be obtained. The number of the base body sealed with the sealing material 13 does not matter. The capacitor can include a pair of electrodes 4 on a substrate so as to act as a single electronic part or plural pairs of electrodes 4 on a substrate so as to act as plural electronic parts. Furthermore, the base body is molded with the sealing material 13 such as resin or the like. Since the base body is molded with the sealing material 13, the durability, humid-resistance and impact strength can be improved, and the capacitor can endure higher pressure.

The external electrodes 4 are conductive members provided at both ends of the base body 20 and make the base body 20 electrically connected to external substrates to be mounted via the lead terminals 12a or the like. Even though a pair of external electrodes 4 is commonly provided at both ends of the base body 20, the pair of external electrodes 4 can be provided in the middle portion of the base body 20. In addition, beside the side surfaces, the external electrodes 4 can be provided at the top and bottom surfaces or throughout the front surfaces of the side, top and bottom surfaces. Furthermore, the external electrodes 4 can be provided at parts of the front surfaces of the side, top and bottom surfaces and can project from the other surfaces.

The external electrodes 4 can be made of a metal material including at least one of Ni, Ag, Pd, Cu, Au (indicated by chemical symbols) or the like. Particularly, it is advantageous in terms of the cost to use Ni or Ni alloy. In addition, the external electrodes 4 can be made of the alloys of the above materials or the plated materials. It is needless to say that the external electrodes 4 can be made of alloys or the like and by a process such as single or multi-layer plating, deposition, sputtering, paste application or the like.

A pair of terminals 12a is connected to the external electrodes 4 and provided at the base body 20. Even though the pair of terminals 12a is commonly provided at both ends, the terminals 12a can be provided at portions other than both ends. For example, when the external electrodes 4 are provided at the top and bottom surfaces, the lead terminals 12a can be connected to the external electrodes 4 formed at the top and bottom surfaces. In addition, the terminals 12a are made of a material including at least one of Cu, Zn, Ni, Ag, Au or the like, and the surfaces of the terminals 12a can be plated with single or multi layers. Furthermore, the terminals 12a can be made of alloys of the above materials.

Still furthermore, the lead terminals 12a can be formed by combining metal caps with the dielectric substrate 2. In addition, it is preferable that the outermost portion (surface portion) of the lead terminals 12a be formed of conductive materials having the melting point of 200° C. or more. With the above configuration, the lead terminals 12a are not thermally damaged even when high temperature is applied to electronic parts due to reflow or the like, and a stable reflow characteristic can be obtained.

In addition, since the sealing material 13, to be described later, is formed by injecting a melted resin to a frame after the base body 20 connected to the lead terminals 12a is inputted in the frame, the lead terminals 12a project from the edge portions that intersect the bottom and side surfaces of the sealing material 13 or from the vicinity of the edge portions on the bottom or side surface.

That is, if the lead terminals 12a are connected to the base body 20; the lead terminals 12a are bent and inserted upside down into the frame; and then the resin is injected into the frame, in which the lead terminals 12a are fixed in a manner that the lead terminals 12a project from the frame, the sealing material 13 fills in a space defined by imaginary planes made by the lead terminals 12a, and consequently, the lead terminals 12a project from the edge portions that intersect the bottom and side surfaces of the sealing material 13 or from the vicinity of the edge portions.

In addition, a single or plurality of slits or interstices can be formed at the tip of the lead terminals 12a, and the above slits improve the bending strength and contribute to the weight reduction of the capacitor.

The sealing material 13 molds resistance including the base body 20, electronic elements such as inductor or the like, and a part of the terminals 12a connected to the resistance and electronic elements. The sealing material 13 is made of epoxy resin such as O-cresol-novolac, biphenyl, pentadiene or the like. It is needless to say that materials other than the above can be mixed and the sealing material 13 can be made of a cheaper resin.

In addition, if the minimum gap (the thinnest portion of the sealing material 13) between the surface of the sealing material 13 and the surface of the base body 20 is defined to be 0.1 mm or more, the withstand voltage of the outer coating can be improved. Furthermore, electronic parts 1 having great withstand voltage, humid-resistance and thermal resistance can be manufactured.

Since the base body 20 is formed by laminating the plurality of substrates made of dielectric substance having the internal electrodes 5a and 5b thereon, the capacitor can have higher capacitance than a single-layer capacitor or the like even when both capacitors have the same size. The dielectric substrate 2 is made of a dielectric substance such as titanium dioxide, barium titanate or the like. In addition, the dielectric substrate 2 can be made of alumina or the like. The capacitor is formed with the above materials to have proper and necessary shape and size.

The internal electrodes 5a and 5b are buried in the base body 20 and made of a metal material including at least one of Ni, Ag, Pd, Cu, Au or the like. Particularly, it is advantageous in terms of the cost to use Ni or Ni alloy. In addition, the external electrodes 4 can be made of the alloys of the above materials or the plated materials. It is needless to say that the external electrodes 4 can be made of alloys or the like. Furthermore, the thickness of the internal electrodes 6 is set in the range of 1 to 5 µm. Still furthermore, it is preferable that the gap between the adjacent internal electrodes 6 be 15 µm or more.

The internal electrodes 5a and 5b are electrically connected to the external electrodes 4, and the internal electrode 6 connected to one external electrode 4 face the internal electrodes 5a and 5b connected to the other external electrode 4. The main capacitance is generated between the facing internal electrodes 6.

Meanwhile, even though the size of the base body 20 is configured to satisfy the following conditions when L1, L2 and L3 represent the length, height and width of the base body 20, $$3.0\ mm \leq L1 \leq 5.5\ mm$$

$$0.5\ mm \leq L2 \leq 2.5\ mm$$

$$1.5\ mm \leq L3 \leq 3.5\ mm$$

it is needless to say that the base body 20 can have the other sizes and a plurality of base bodies 20 can be sealed with the sealing material 13.

Meanwhile, if L1 to L3 is less than the minimum values of the above conditions, the areas of the internal electrode 6 become insufficient, and thus the gaps between the internal electrodes 6 become narrow. As a result, the number of internal electrodes 5a and 5b should be decreased, therefore the large capacitance becomes difficult to obtain, and electronic parts having wide capacitance become difficult to obtain.

In addition, when the base body 20 is molded with the sealing material 5, it is preferable that the edge portions of the mold capacitor 50b be removed or take a form of circular arc at parts of or all side surfaces in order to prevent the base body 20 from being damaged by impact. Meanwhile, the lead terminals 12a can be provided at the top and bottom surfaces as well as the side surfaces of the base body 20 so as to project toward the outside of the sealing material 13 from the above surfaces.

Meanwhile, it is possible to apply the multilayer capacitor of the first to third embodiments to the fourth embodiment. Then, the size of the multilayer capacitor can be sought to decrease, and the withstand voltage of the multilayer capacitor can be increased while the humid-resistance and durability can be improved.

(Fifth Embodiment)

Figure 8:
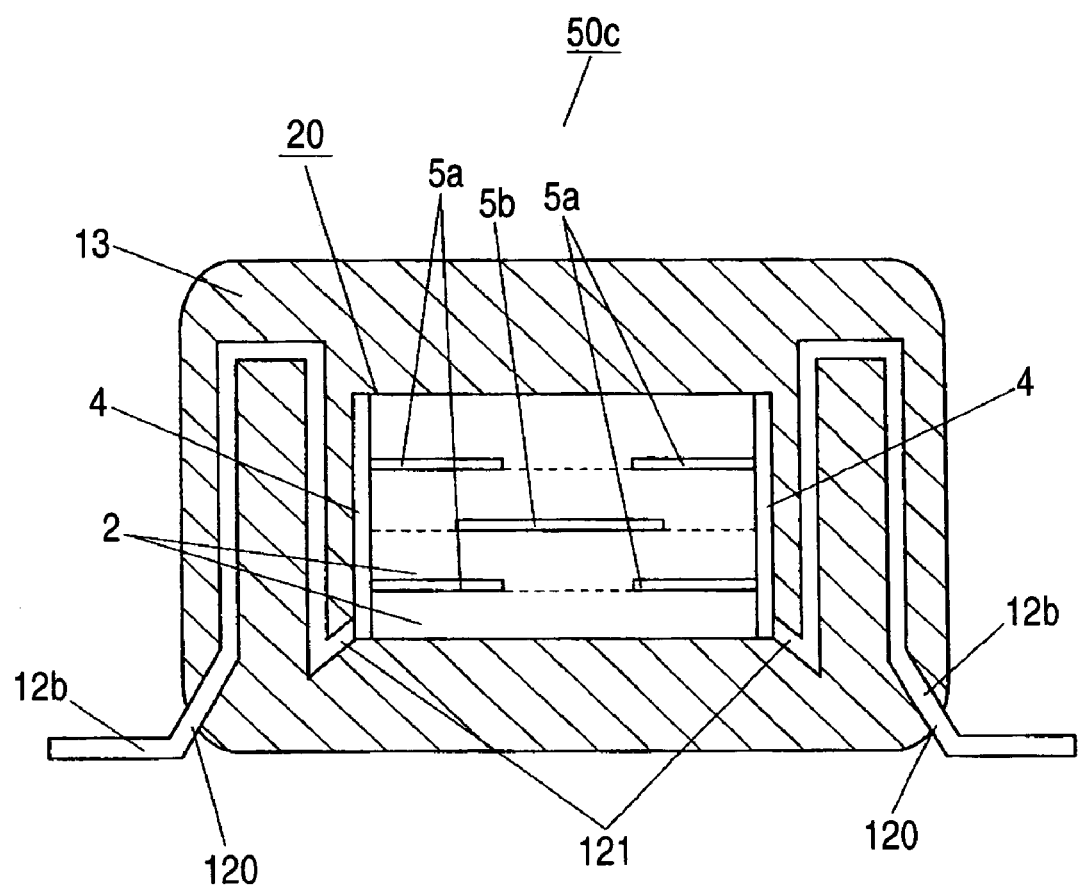
FIG. 8 is a side cross-sectional view of the mold capacitor 50c according to the fifth embodiment of the invention.

FIG. 8 is a side cross-sectional view of the mold capacitor 50c according to the fifth embodiment of the invention. In the mold capacitor 50c in FIG. 8, the pair of lead terminals 12b electrically connected to the base body 20 that composes the base body is largely bent from connecting ends 121 connected to the base body 20 respectively to exposing ends 120 exposed from the sealing material 13. That is, the lead terminals 12b are bent in a U-shape at the potions hidden by the sealing material (exterior material) 13.

In the mold capacitor 50c constructed as above, since the lead terminals 12b are bent in a U-shape, the lead terminals 12b can be made longer from a portion exposed to the external environment to a portion connected to the base body 20 than that of the embodiment in FIG. 7 in the sealing material 13 while the size of the mold capacitor 50c is kept compact. As a result, moisture intruding into the base body 20 along the surface of the lead terminal 12b can be suppressed, and electronic parts having further improved humid-resistance, durability and withstand voltage can be manufactured.

Meanwhile, it is possible to apply the multilayer capacitor of the first to third embodiments to the fifth embodiment. Then, the size of the multilayer capacitor can be reduced, and the withstand voltage of the multilayer capacitor can be increased while the humid-resistance and durability can be improved.

(Sixth Embodiment)

Figure 9:
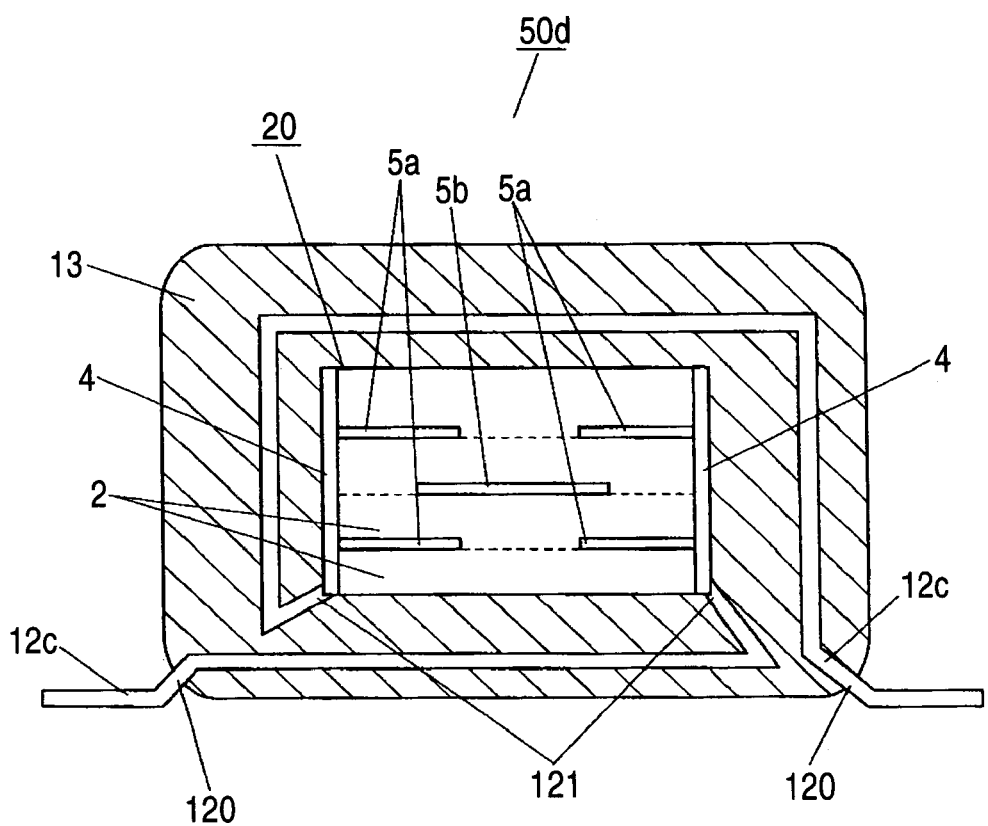
FIG. 9 is a side cross-sectional view of an electronic part according to the sixth embodiment of the invention.

FIG. 9 is a side cross-sectional view of an electronic part according to the sixth embodiment of the invention. In the mold capacitor 50d in FIG. 9, the pair of lead terminals 12c electrically connected to the base body 20 that composes the base body is largely bent from connecting ends 121 connected to the base body 20 respectively to exposing ends 120 exposed from the sealing material 13. The pair of lead terminals 12c projects toward outside from portions located opposite to the projecting portions of the capacitor in the related art.

In the mold capacitor 50d constructed as above, since the lead terminals 12c occupy the outer circumference of the sealing material 13, the lead terminals 12c can be made longer from a portion exposed to the external environment to a portion connected to the base body 20 than that of the embodiment in FIG. 8 while the thickness of the sealing material 13 is kept constant. As a result, moisture intruding into the base body 20 along the surface of the lead terminal 12c can be suppressed, and electronic parts having further improved humid-resistance, durability and withstand voltage can be manufactured.

Meanwhile, it is possible to apply the multilayer capacitor of the first to third embodiments to the sixth embodiment. Then, the size of the multilayer capacitor can be reduced, and the withstand voltage of the multilayer capacitor can be increased while the humid-resistance and durability can be improved.

(Seventh Embodiment)

Figure 10:
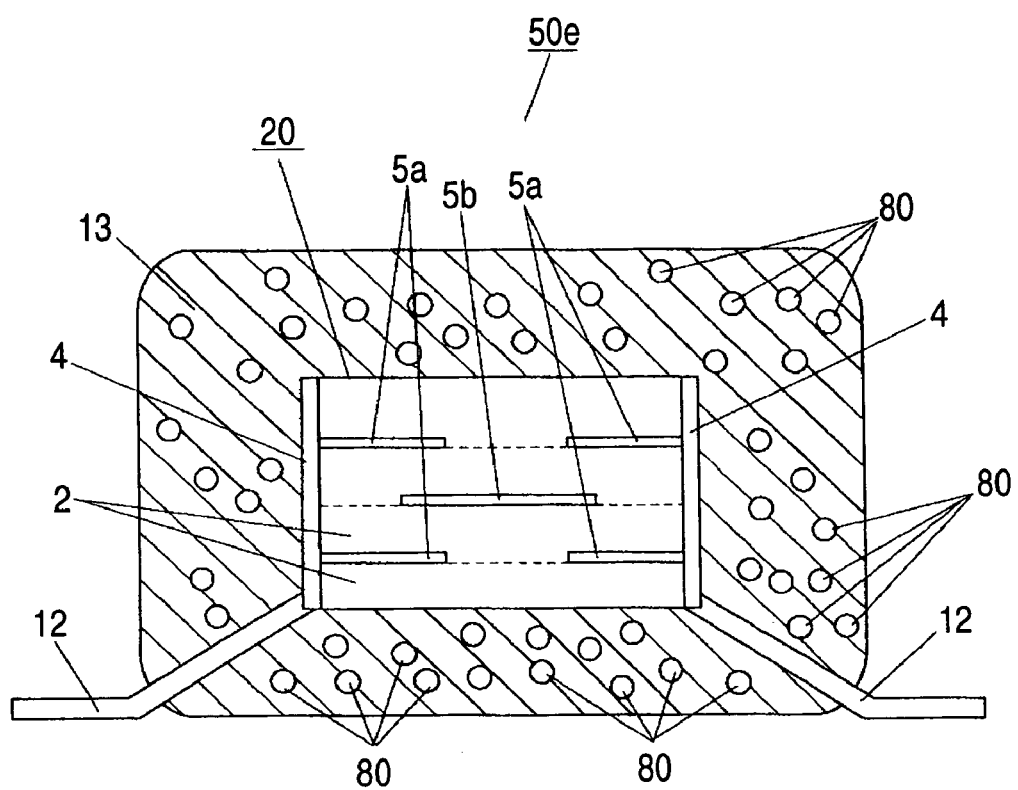
FIG. 10 is a side cross-sectional view of the mold capacitor 50e of a seventh embodiment according to the invention.

FIG. 10 is a side cross-sectional view of the mold capacitor 50e of a seventh embodiment according to the invention. In FIG. 10, the reference numeral 50e is the mold capacitor, the reference numeral 2 is the dielectric substrate, the reference numeral 4 is the external electrode, the reference numeral 12 is the lead terminal, the reference numeral 13 is a sealing material (exterior material), the reference numerals 5a and 5b are the internal electrodes, the reference number 80 is an additive material (protecting member), which is a plurality of grains, and the reference numeral 20 is a multilayer body that composes the base body 20. The mold capacitor 50e includes the base body 20 formed by laminating the plurality of rectangular plate-like dielectric substrates 2. The plurality of divided internal electrodes 5a and 5b is formed on the main surface of the dielectric substrate 2.

There are two kinds of internal electrode 6, that is, a drawing electrode 5a extending to the end of the dielectric substrate 2 and a floating electrode 5b surrounded with insulator. In addition, there are two kinds of dielectric substrate 2, that is, a dielectric substrate having the drawing electrodes 6a and the floating electrodes 6b on the main surface and a dielectric substrate having only the floating electrodes 6b on the main surface. Furthermore, the base body 20 is formed by laminating the two kinds of dielectric substrates alternatively.

The base body 20 is formed substantially in a cuboid, and a pair of external electrodes 4 is provided at two side surfaces facing each other in the first direction, which is the longitudinal direction. The drawing electrodes 5a formed on the dielectric substrate 2 are connected to the external electrodes 4 at the edge portions of the dielectric substrate 2.

The pair of lead terminals 12 is connected to the pair of external electrodes 4. The sealing material (exterior material) 13 seals the base body 20 and a part of the lead terminals 12a and 12b. In addition, in the sealing material 13 of the seventh embodiment, granular additive material 80 having a larger thermal expansion coefficient than that of the sealing material 13 is distributed at a uniform ratio. Furthermore, each tip of the lead terminals 12 is exposed from the sealing material 13.

The mold capacitor 50e constructed as above has a considerably high capacitance consisting of the summed capacitance generated between the facing internal electrodes 5a and 5b. In addition, the multilayer capacitor has a larger capacitance than a single-layered capacitor if the both capacitors have the same shape and size and are made of the same material. Furthermore, the mold capacitor 50e of the seventh embodiment is sealed with the sealing material, in which the additive material 80 having different thermal expansion coefficient from the sealing material is mixed. If the temperature of the sealing material 13 increases, the additive material 80 blocks the gaps between the lead terminals 12 and the sealing material 13 caused by thermal expansion. As a result, moisture included in the external air cannot intrude.

Meanwhile, even though the mold capacitor 50e of the seventh embodiment is mounted with the multilayer capacitor formed of the base body 20 as base body, the base body is not limited to the multilayer capacitor, and, for example, a single-layered capacitor can also be mounted. In addition, besides the capacitor, even when electronic elements such as resistance, inductor, filter or the like are mounted, the same effect can be obtained. The base body can be sealed with a single sealing material 13 or plural sealing materials 13. The capacitor can include a pair of electrodes 4 on a substrate so as to act as a single electronic part or plural pairs of electrodes 4 on a substrate so as to act as a plurality of electronic parts. Furthermore, the base body is molded with the sealing material 13 such as resin or the like. If the capacitor is molded with the sealing material 13, the durability, humid-resistance and impact strength are improved, and consequently, the capacitor can endure higher pressure.

The external electrodes 4 are conductive members provided at both ends of the base body 20 and make the base body 20 electrically connected to external substrates to be mounted via the lead terminals 12a or the like. Even though the pair of external electrodes 4 is commonly provided at both ends of the base body 20, the pair of external electrodes 4 can be provided in the middle portion of the base body 20. In addition, beside the side surfaces, the external electrodes 4 can be provided at the top and bottom surfaces or throughout the front surfaces of the side, top and bottom surfaces. Furthermore, the external electrodes 4 can be provided at parts of the front surfaces of the side, top and bottom surfaces and project from the other surfaces.

The external electrodes 4 can be made of a metal material including at least one of Ni, Ag, Pd, Cu, Au (indicated by chemical symbols) or the like. Particularly, it is advantageous in terms of the cost to use Ni or Ni alloy. In addition, the external electrodes 4 can be made of the alloys of the above materials or the plated materials. It is needless to say that the external electrodes 4 can be made of alloys or the like and by a process such as single or multi-layer plating, deposition, sputtering, paste application or the like.

The pair of lead terminals 12a is connected to the external electrodes 4 and provided at the base body 20. Even though the pair of lead terminals 12a is commonly provided at both ends, the lead terminals 12a can be provided at portions other than both ends. For example, if the external electrodes 4 are provided at the top and bottom surfaces, the lead terminals 12a can be connected to the external electrodes 4 formed at the top and bottom surfaces. In addition, the terminals 12a are made of a material including at least one of Cu, Zn, Ni, Ag, Au or the like, and the surfaces of the terminals 12a can be plated with single or multi layers. Furthermore, the terminals 12a can be made of alloys of the above materials.

Still furthermore, the lead terminals 12a can be formed by combining metal caps with the dielectric substrate 2. In addition, it is preferable that the outermost portion (surface portion) of the lead terminals 12a be made of conductive materials having the melting point of 200° C. or more. With the above configuration, the lead terminals 12a are not thermally damaged even when high temperature is applied to electronic parts due to reflow or the like, and a stable reflow characteristic can be obtained.

In addition, since the sealing material 13, to be described later, is formed by injecting a melted resin to a frame after the base body 20 connected to the lead terminals 12 is inputted in the frame, the lead terminals 12 project from the edge portions that intersect the bottom and side surfaces of the sealing material 13 or from the vicinity of the edge portions on the bottom or side surface.

That is, if the lead terminals 12 are connected to the base body 20; the lead terminals 12 are bent and inserted upside down into the frame; and then the resin is injected into the frame, in which the lead terminals 12a are fixed in a manner that the lead terminals 12 project from the frame, the sealing material 13 fills in a space defined by imaginary planes made by the lead terminals 12a, and consequently, the lead terminals 12 project from the edge portions that intersect the bottom and side surfaces of the sealing material 13 or from the vicinity of the edge portions. In addition, a single or plurality of slits or interstices can be formed at the tip of the lead terminals 12, and the above slits improve the bending strength and contribute to the weight reduction of the capacitor.

The sealing material 13 molds resistance including the base body 20, electronic elements such as inductor or the like, and a part of the terminals 12 connected to the resistance and electronic elements. The sealing material 13 is made of epoxy resin such as O-cresol-novolac, biphenyl, pentadiene or the like. It is needless to say that materials other than the above can be mixed and the sealing material 13 can be made of cheaper resin.

In addition, if the minimum gap (the thinnest portion of the sealing material 13) between the surface of the sealing material 13 and the surface of the base body 20 is defined to be 0.1 mm or more, the withstand voltage of the outer coating can be improved. Furthermore, the mold capacitor

50e having great withstand voltage, humid-resistance and thermal resistance can be manufactured.

Since the base body 20 is formed by laminating the plurality of substrates made of dielectric substance having the internal electrodes 5a and 5b thereon, the capacitor can have higher capacitance than a single-layer capacitor or the like even when both capacitors have the same size. The dielectric substrate 2 is made of a dielectric substance such as titanium dioxide, barium titanate or the like. In addition, the dielectric substrate 2 can be made of alumina or the like. The capacitor is formed with the above materials to have proper and necessary shape and size.

The internal electrodes 5a and 5b are buried in the base body 20 and made of a metal material including at least one of Ni, Ag, Pd, Cu, Au or the like. Particularly, it is advantageous in terms of the cost to use Ni or Ni alloy. In addition, the external electrodes 4 can be made of the alloys of the above materials or the plated materials. It is needless to say that the external electrodes 4 can be made of alloys or the like. Furthermore, the thickness of the internal electrodes 6 is set in the range of 1 to 5 μm. Still furthermore, it is preferable that the gap between the adjacent internal electrodes 6 be 15 μm or more.

The internal electrodes 5a and 5b are electrically connected to the external electrodes 4, and the internal electrode 6 connected to only one external electrode 4 face the internal electrodes 5a and 5b connected to the other external electrode 4. The main capacitance is generated between the facing internal electrodes 5a and 5b.

Meanwhile, even though the size of the base body 20 is configured to satisfy the following conditions when L1, L2 and L3 represent the length, height and width of the base body 20, $$3.0\ \text{mm} \leq L1 \leq 5.5\ \text{mm}$$

$$0.5\ \text{mm} \leq L2 \leq 2.5\ \text{mm}$$

$$1.5\ \text{mm} \leq L3 \leq 3.5\ \text{mm}$$

it is needless to say that the base body 20 can have the other sizes and a plurality of base bodies 20 can be sealed with the sealing material 13.

Meanwhile, if L1 to L3 is less than the minimum values of the above conditions, the areas of the internal electrode 6 become insufficient, and thus the gaps between the internal electrodes 6 become narrow. As a result, the number of internal electrodes 5a and 5b should be decreased, therefore, the large capacitance becomes difficult to obtain, and electronic parts having wide capacitance becomes difficult to obtain.

In addition, when the base body 20 is molded with the sealing material 5, it is preferable that the edge portions of the mold capacitor 50b be removed or take a form of circular arc at parts of or all side surfaces in order to prevent the base body 20 from being damaged by impact. Meanwhile, the lead terminals 12a can be provided at the top and bottom surfaces as well as the side surfaces of the base body 20 so as to project toward the outside of the sealing material 13 from the above surfaces.

The additive material 80 can be a material having a higher thermal expansion coefficient than that of the sealing material 13 or a material, which is an epoxy resin having higher thermal expansion coefficient, when the sealing material 13 is made of an epoxy resin. In addition, the additive material 80 can be made of a material, which is not an epoxy material and has a high thermal expansion coefficient than that of the sealing material 13.

Meanwhile, it is possible to apply the multilayer capacitor of the first to third embodiments to the seventh embodiment. Then, the size of the multilayer capacitor can be reduced, and the withstand voltage of the multilayer capacitor can be increased while the humid-resistance and durability can be improved.

(Eighth Embodiment)

Figure 11:
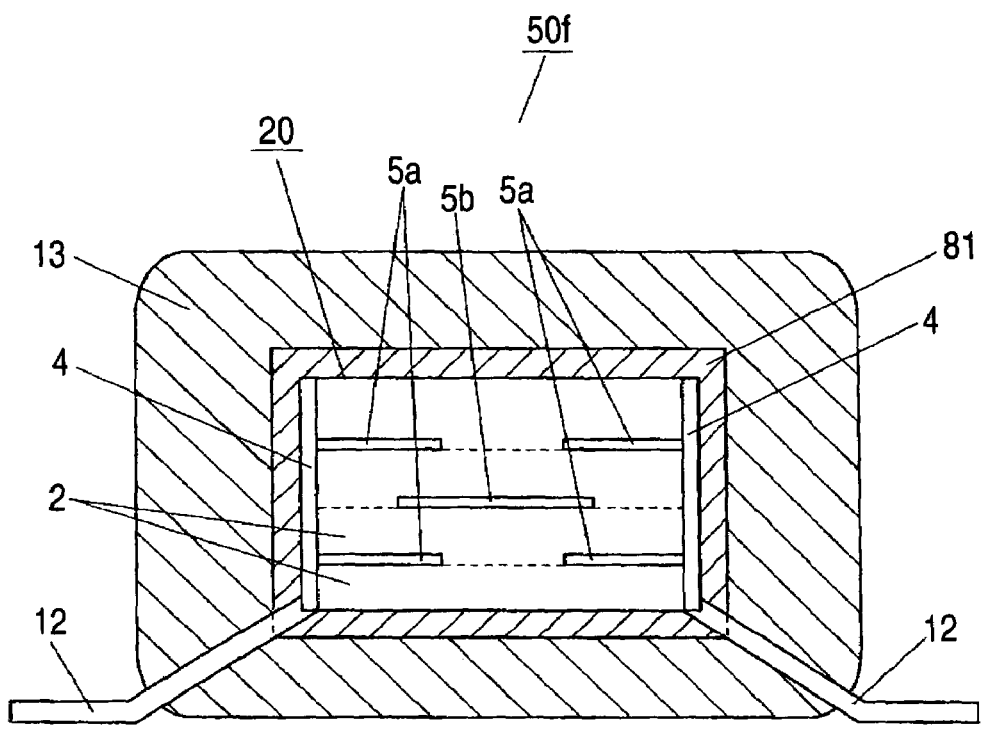
FIG. 11 is a side cross-sectional view of the mold capacitor according to the eighth embodiment of the invention.

FIG. 11 is a side cross-sectional view of the mold capacitor according to the eighth embodiment of the invention. In the mold capacitor 50f in FIG. 11, a protecting layer (protecting member) 81 made of a material having a larger thermal expansion coefficient than that of the sealing material 13 is formed to seal the base body 20 in the sealing material 13. The protecting layer 81 surrounds the outer circumference of the base body 20 with no gap therebetween. The gap between the sealing material 13 and the lead terminal 12, which is generated by the thermal expansion of the sealing material 13 when the temperature of the capacitor increases is blocked by expanding the protecting layer 81 having a larger thermal expansion coefficient, and moisture flowed into the capacitor from the outside during temperature change is shut. Then, the humid-resistance, durability, withstand voltage and the like improve. In this case, contrary to the case in FIG. 10, since the protecting layer 81 surrounds the outer circumference of the base body 20, it is possible to block the gap at the border of the protecting layer 81 and the lead terminals 12 satisfactorily.

Meanwhile, it is possible to apply the multilayer capacitor of the first to third embodiments to the eighth embodiment. Then, the size of the multilayer capacitor can be reduced, and the withstand voltage of the multilayer capacitor can be increased while the humid-resistance and durability can be improved.

(Ninth Embodiment)

Figure 12:
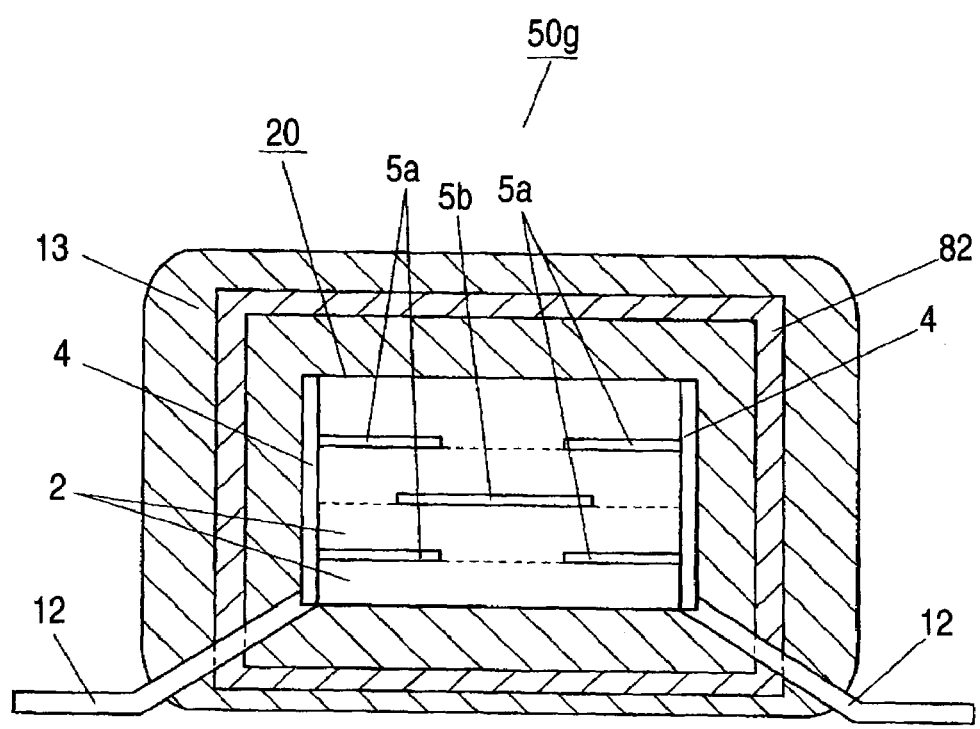
FIG. 12 is a side cross-sectional view of the mold capacitor according to the ninth embodiment of the invention.
Figure 13:
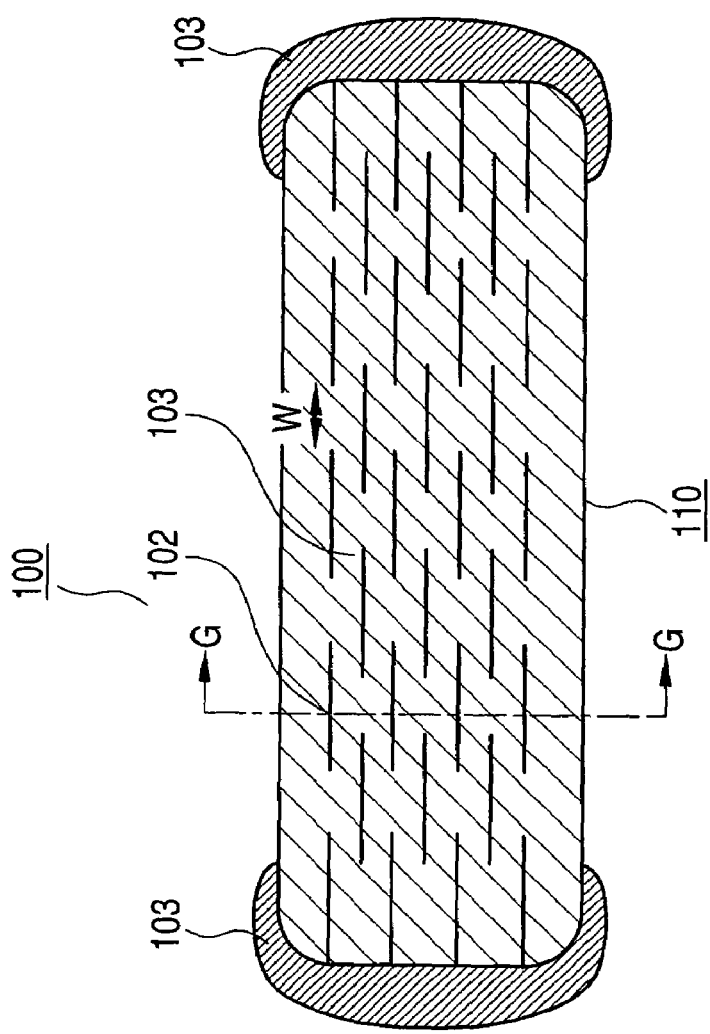
FIG. 13(a) is a side cross-sectional view of a multilayer capacitor in the related art.
FIG. 13(b) is a cross sectional view of the multilayer capacitor taken along the line G—G in FIG. 13(a).
Figure 13:
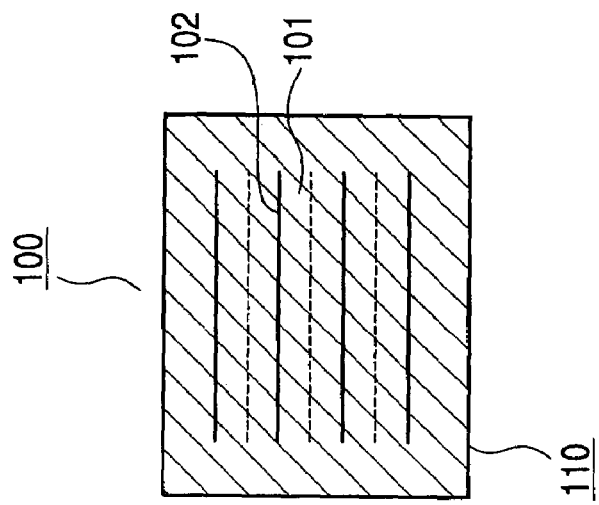

FIG. 12 is a side cross-sectional view of the mold capacitor according to the ninth embodiment of the invention. In the mold capacitor 50g in FIG. 12, a protecting layer (protecting member) 82 made of a material having a larger thermal expansion coefficient than the sealing material 13 is formed to seal the base body 20 in the sealing material 13. The gap between the sealing material 13 and the lead terminal 12, which is generated by the thermal expansion of the sealing material 13 when the temperature of the capacitor increases is blocked by expanding the protecting layer 82 having a larger thermal expansion coefficient, and moisture flowed into the capacitor from the outside during temperature change is shut. Then, the humid-resistance, durability, withstand voltage and the like improve. In addition, in this case, contrary to the case in FIG. 11, since the protecting layer 82 surrounds the outer circumference of the base body 20 with a certain gap therebetween, it is possible not to generate the peel-off between the base body 20 and the protecting layer 82.

Like the additive material 80, the protecting layers 81 and 82 can be a material having a higher thermal expansion coefficient than the sealing material 13 or a material, which is an epoxy resin and has higher thermal expansion coefficient, when the sealing material 13 is made of an epoxy resin. In addition, the protecting layers 81 and 82 can be made of a material, which is not an epoxy material and has a high thermal expansion coefficient than that of the sealing material 13.

Meanwhile, it is possible to apply the multilayer capacitor of the first to third embodiments to the ninth embodiment. Then, the size of the multilayer capacitor can be reduced, and the withstand voltage of the multilayer capacitor can be increased while the humid-resistance and durability can be improved.

This application is based upon and claims the benefit of priorities of Japanese Patent Application Nos. 2005-12313 filed on Jan. 20, 2005, and 2005-162276 and 2005-162277 both filed on Jun. 2, 2005, the contents of which are incorporated herein by reference in its entirety.

What is claimed is:

1. A multilayer capacitor, comprising:
a base body that is a dielectric substance; and
a plurality of electrode layers that are laminated in the base body, each of the plurality of electrode layers having a plurality of electrodes which are separated each other,
wherein the plurality of electrode layers includes at least three or more kinds of electrode layers having different number of electrodes, and a kind of electrode layer having the most electrodes is interposed between the other kinds of electrode layers.

2. The multilayer capacitor according to claim 1, wherein the base body is formed of a plurality of laminated dielectric substrates, and the plurality of electrodes is formed on all or a part of each dielectric substrate.

3. The multilayer capacitor according to claim 2, wherein the thickest dielectric substrate among the plurality of dielectric substrates is laminated at or near a central portion of the base body.

4. The multilayer capacitor according to claim 1, wherein the electrode layer having the most electrodes is laminated at or near a central portion of the base body in a direction, in which the plurality of electrodes is laminated.

5. The multilayer capacitor according to claim 4, wherein, in the plurality of electrode layers, the number of electrodes increases as it becomes closer to the central portion of the base body in the direction, in which the plurality of electrodes is laminated.

6. The multilayer capacitor according to claim 1, wherein, in at least one electrode layer, the plurality of electrode is formed most densely at or near the central portion of the electrode layer in a direction perpendicular to the direction, in which the electrodes are laminated.

7. The multilayer capacitor according to claim 6, wherein, in the electrode layer having the most electrodes, the plurality of electrode is formed most densely at or near the central portion of the electrode layer in a direction perpendicular to the direction, in which the electrodes are laminated.

8. The multilayer capacitor according to claim 6, wherein, in at least one electrode layer, the plurality of electrodes becomes denser as it becomes closer to the central portion of the electrode layer in the direction perpendicular to the direction in which the electrodes are laminated.

9. The multilayer capacitor according to claim 1, further comprising a plurality of base bodies.

10. A mold capacitor, comprising:
the multilayer capacitor according to claim 1;
a pair of lead terminals connected to the multilayer capacitor; and
an exterior material that covers a part of the pair of lead terminals and the whole multilayer capacitor.

11. The mold capacitor according to claim 10, wherein at least one of the lead terminals is bent at a portion covered with the exterior material.

12. The mold capacitor according to claim 11, wherein at least one of the lead terminals is bent in a U-shape at the portion covered with the exterior material.

13. The mold capacitor according to claim 11, wherein at least one of the lead terminals surrounds an outer circumference of the base body at the portion covered with the exterior material.

14. The mold capacitor according to claim 10, further comprising:
a protecting member that surrounds the outer circumference of the base body,
wherein thermal expansion coefficient of the protecting member is larger than that of the exterior material.

15. The mold capacitor according to claim 14, wherein the protecting member is formed of a plurality of grains.

16. The mold capacitor according to claim 14, wherein the protecting member surrounds the outer circumference of the base body with no gap therebetween.

17. The mold capacitor according to claim 14, wherein the protecting member surrounds the outer circumference of the base body with a certain gap therebetween.

* * * * *